US010025363B2

(12) United States Patent
Agrawal et al.

(10) Patent No.: US 10,025,363 B2
(45) Date of Patent: Jul. 17, 2018

(54) DEVICE AGNOSTIC POWER MONITORING AND PROFILING SYSTEM

(71) Applicant: Intel Corporation, Santa Clara, CA (US)

(72) Inventors: Abhishek Agrawal, Folsom, CA (US); Thyagarajan Srinivasan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 14/568,836

(22) Filed: Dec. 12, 2014

(65) Prior Publication Data

US 2016/0170463 A1  Jun. 16, 2016

(51) Int. Cl.
*G06F 1/28* (2006.01)
*H04W 4/80* (2018.01)

(52) U.S. Cl.
CPC ............... *G06F 1/28* (2013.01); *H04W 4/80* (2018.02)

(58) Field of Classification Search
None
See application file for complete search history.

(56) References Cited

U.S. PATENT DOCUMENTS

| 6,237,112 | B1 * | 5/2001 | Yoo | G06F 11/008 |
| | | | | 714/30 |
| 2009/0164809 | A1 * | 6/2009 | Kim | G11C 29/021 |
| | | | | 713/300 |
| 2010/0117625 | A1 | 5/2010 | Botts | |
| 2011/0112780 | A1 * | 5/2011 | Moss | G01D 4/002 |
| | | | | 702/62 |
| 2012/0197448 | A1 * | 8/2012 | Shin | G06Q 10/06 |
| | | | | 700/286 |

(Continued)

FOREIGN PATENT DOCUMENTS

| JP | 2010098900 A | 4/2010 |
| JP | 2010262468 A | 11/2010 |

OTHER PUBLICATIONS

International Search Report and Written Opinion received for PCT Application No. PCT/US2015/064906, dated Apr. 4, 2016, 13 pages.

(Continued)

*Primary Examiner* — Paul J Yen
(74) *Attorney, Agent, or Firm* — Grossman, Tucker, Perreault & Pfleger, PLLC

(57) ABSTRACT

The present disclosure is directed to device-agnostic power monitoring and profiling. A target device may be supplied with power through a power monitor that may generate power data based on the power provided to the target device and also transmit the power data. A diagnostic module in the target device may receive the power data and operational data regarding the target device. The diagnostic module may transmit at least one of the power data or the operational data to another device for processing, or may undertake processing the power and operational data. Processing the power and operational data may include generating relevant data by parsing the power and operational data and may then correlate the relevant power data with the relevant operational data. At least the correlated data may then be presented by the target device, may be made available via the Internet and/or may be transmitted to another device.

19 Claims, 4 Drawing Sheets

(56) References Cited

U.S. PATENT DOCUMENTS

2013/0238150 A1    9/2013    Vaum et al.
2014/0095728 A1*    4/2014    Zhu ..................... H04W 4/005
                                                                     709/231
2015/0227445 A1*    8/2015    Arscott ............... G06F 11/3062
                                                                     713/340

OTHER PUBLICATIONS

McCullough, John C., et al., "Evaluating the Effectiveness of Model-Based Power Characterization," USENIX11, UC San Diego and Intel Labs, Berkeley, 2011.

International Preliminary Report on Patentability and Written Opinion issued in PCT Application No. PCT/US2015/064906, dated Jun. 22, 2017, 10 pages.

* cited by examiner

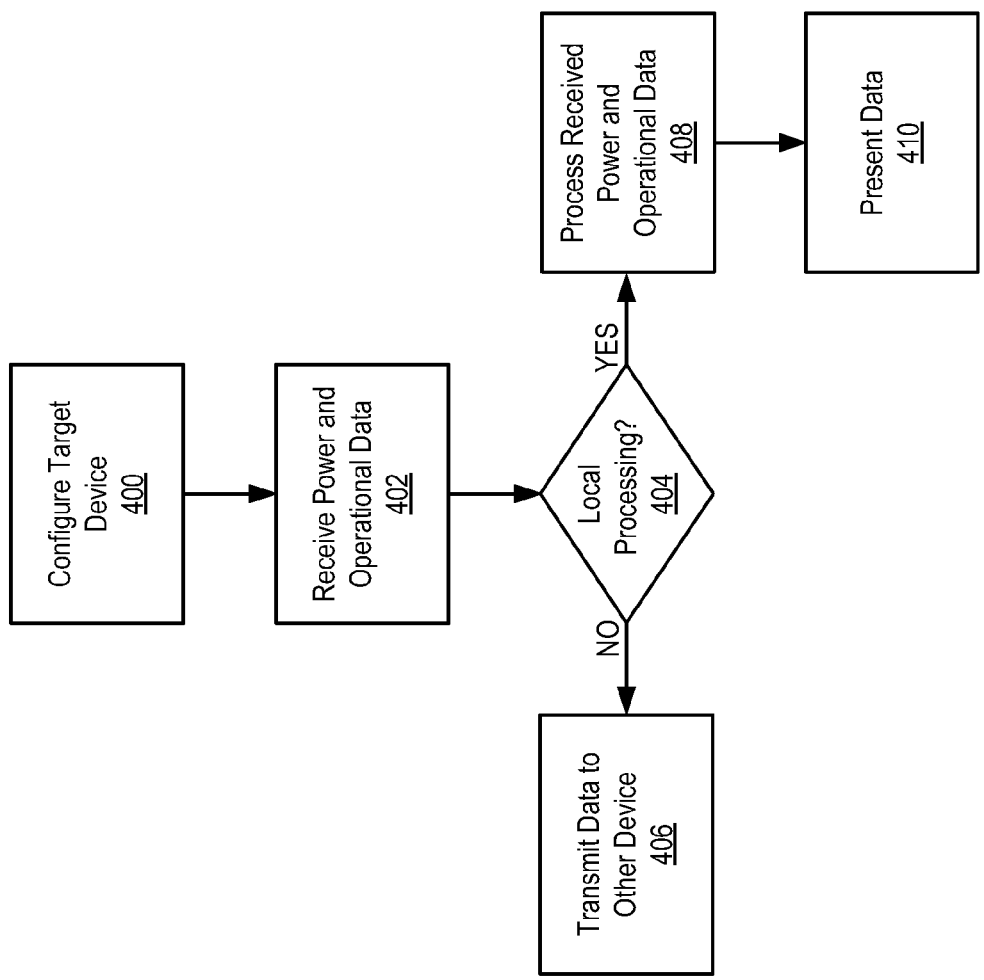

DEVICE AGNOSTIC POWER MONITORING AND PROFILING SYSTEM

TECHNICAL FIELD

The present disclosure relates to monitoring systems, and more particularly, to a system capable of monitoring and profiling power use in a device regardless of the device configuration.

BACKGROUND

Power consumption is a characteristic that may be closely monitored when designing new electronic devices. Not only is power consumption important in portable electronic devices (e.g., smart phones, tablet computers, notebooks, laptops, etc.) where the limitations of internal power sources, (e.g., batteries) are readily apparent, but also to ensure that all electronic devices comply with power consumption guidelines set forth by various organizations, governmental bodies, etc. (e.g., environmental groups, educational institutions, state regulations, Energy Star from the U.S. Environmental Protection Agency, etc.). Power consumption may be monitored throughout the design process, and into the lifecycle of products released to the public. This allows designers to understand power consumption characteristics of a basic device, and also to comprehend how the power consumption of the device changes when configured by the user (e.g., how different uses, modifications, applications, etc. may affect power consumption in the device). Observing how devices may operate in real-life usage situations may be important to, for example, aftermarket developers for peripheral equipment, applications, etc. that want to understand how the products they develop will affect power consumption in a device (e.g., will an application cause a device to consume too much power, and thus, will users be disinclined to purchase the application, etc.).

Power monitoring is typically performed based on cause or effect analysis. For example, in a cause-based analysis the operation of a device system (e.g., a central processing unit (CPU)) may be monitored as a proxy for power utilization in the device. In an effect-based analysis, the rate at which power is consumed may be approximated, and then a relationship may be derived between activities that were occurring on the device during the period when power consumption was being monitored. Conclusions resulting from either type of analysis are typically inaccurate as they may be based on estimated power usage extrapolated from various conditions observed in the device. This is necessary because often aftermarket developers do not have tools available to conduct proper power consumption monitoring that considers both potential causes and effects.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 4 illustrates example operations for device-agnostic power monitoring and profiling in accordance with at least one embodiment of the present disclosure.

Figure 1:
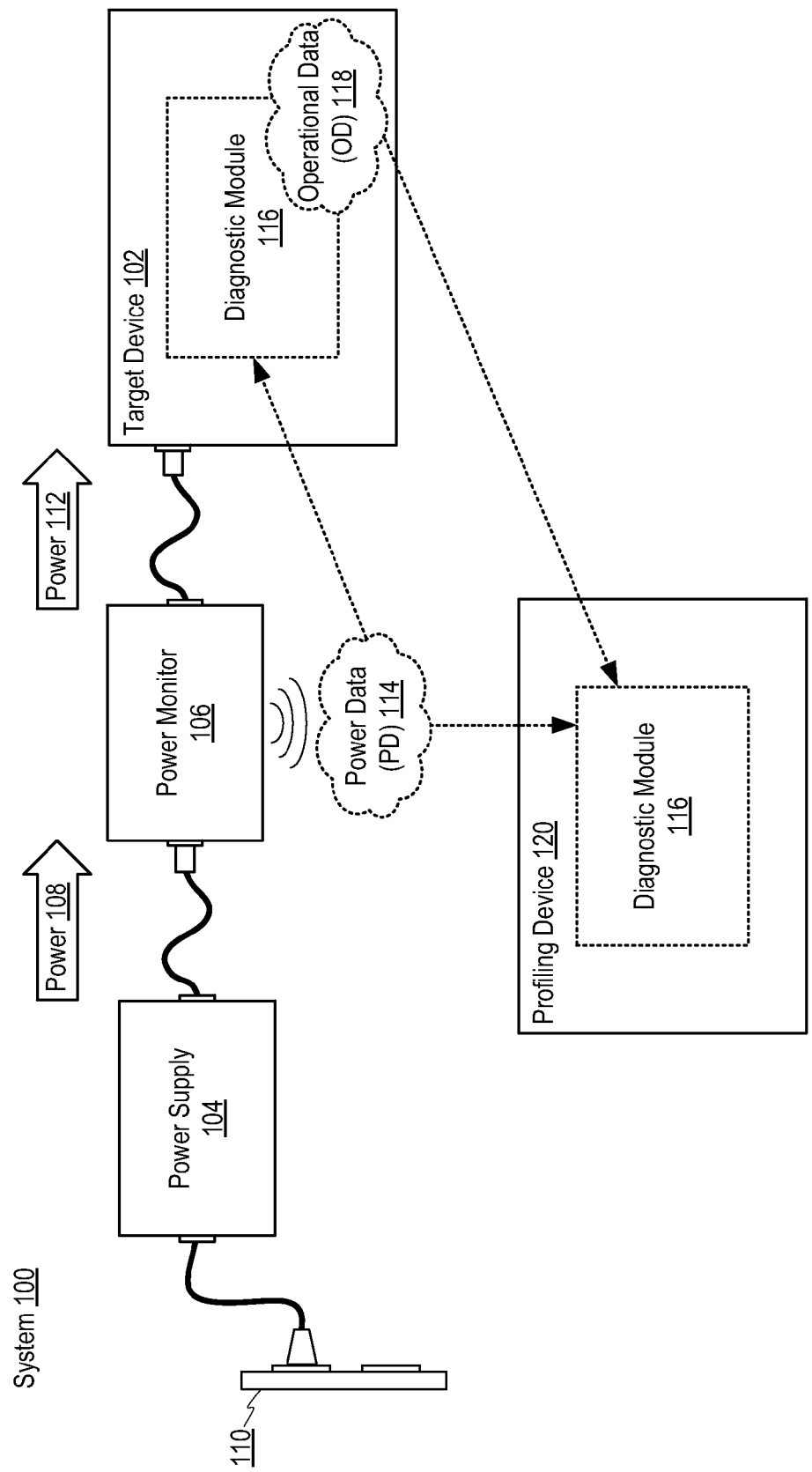
FIG. 1 illustrates an example system for device-agnostic power monitoring and profiling in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to device-agnostic power monitoring and profiling. In at least one embodiment, a target device may be supplied with power through a power monitor.

The power monitor may generate power data based on the power provided to the target device, and may also transmit the power data (e.g., via wireless communication). A diagnostic module in the target device may receive the power data and operational data regarding the target device. In at least one embodiment, the diagnostic module may transmit at least one of the power data or the operational data to another device for processing (e.g., a profiling device). Alternatively, the diagnostic module may process the power and operational data. In processing the power and operational data, the diagnostic module may generate relevant data by parsing the power and operational data and may then correlate the relevant power data with the relevant operational data. At least the correlated data may then be presented by the target device, may be made available via the Internet and/or may be transmitted to another device (e.g., the profiling device).

In at least one embodiment, an example target device may comprise a processing module, communication module, power module and diagnostic module. The processing module may be to at least generate operational data regarding the target device. The communication module may be to at least interact with a power monitor. The power module may be to at least receive power via the power monitor. The diagnostic module may be to at least receive the power data from the power monitor via the communication module and to receive the operational data from the processing module. The diagnostic module may further be to cause the target device to become configured for power monitoring. In causing the target device to become configured, the diagnostic module may be to, for example, cause the target device to at least disable an internal power source. In at least one example implementation ,the power monitor may be external to and coupled to the target device, the power monitor comprising at least a power usage tracking module to at least generate the power data and a communication module to at least transmit the power data. The communication module in the power monitor may be to at least transmit the power data via a short-range wireless communication medium.

In at least one embodiment, the diagnostic module may further be to cause at least one of the power data or the operational data to be transmitted to another device. Alternatively, the diagnostic module may further be to process the power and operational data. In processing the power and operational data, the diagnostic module may be to at least parse the power and operational data to determine relevant power and operational data, and to correlate the relevant power with the relevant operational data. The diagnostic module may further be to cause at least one of the correlated data to be presented by the target device, the correlated data to be accessible via the Internet or the correlated data to be transmitted to another device.

Consistent with the present disclosure, an example power monitor may comprise a first power interface through which power is received from a power source, a second power interface through which the power is provided to a target device, a power usage tracking module to at least generate power data regarding the power provided to the target device and a communication module to at least transmit the power data. The communication module in the power monitor may be to at least transmit the power data via a short-range wireless communication medium. An example method for power monitoring and profiling may comprise receiving power in a target device via a power monitor, receiving power data at a diagnostic module in the target device from the power monitor, generating operational data in a processing module in the target device and receiving the operational data from the processing module at the diagnostic module.

FIG. 1 illustrates an example system for device-agnostic power monitoring and profiling in accordance with at least one embodiment of the present disclosure. For example, system 100 may comprise target device 102, power supply 104, power monitor 106 and optionally profiling device 120. Target device 102 may be a device for which power usage is to be monitored and profiled. In general, "monitoring" may include activities resulting in the accumulation of power data 114 and operational data 118 for target device 102, while "profiling" may include activities involved in correlating power data 114 to what operational data 118 indicates may be occurring in target device 102 during the monitoring. Embodiments consistent with the present disclosure may be "device-agnostic." Device-agnostic may indicate that power monitoring and profiling may occur for target device 102 without having to undergo substantial reconfiguration to adapt system 100 to the particular characteristics of target device 102. As a result, target device 102 could be a variety of devices including, but not limited to, a mobile communication device such as a cellular handset or a smartphone based on the Android® OS from the Google Corporation, iOS® from the Apple Corporation, Windows® OS from the Microsoft Corporation, Mac OS® from the Apple Corporation, Tizen OS from the Linux Foundation, Firefox OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc.

Power supply 104 may by coupled to power source 110 (e.g., a wall socket coupled to an electrical grid) for generating power 108. In at least one embodiment, power supply 104 may be configured to transform an alternating current (AC) voltage into a direct current (DC) voltage for powering target device 102. Power supply 104 may be a generic power supply configurable to operate with a variety of devices, or may be a proprietary power supply configured specifically to power target device 102. Consistent with the present disclosure, power monitor 106 may be inserted between power supply 104 and target device 102. Power monitor 106 may receive power 108 and provide power 112 to target device 102. In at least one embodiment, power 108 may be substantially equal to power 112 (e.g., the power may flow through power monitor 106 without any modification). Power monitor 106 may generate power data 114 based on power 112 supplied to target device 102. For example, power monitor 106 may measure power-related data (e.g., including current, voltage, power, etc.) related to power 112 supplied to target device 102. The measurements may occur periodically following the activation of power monitor 106, periodically while power monitor 106 is connected to target device 102, periodically for a set monitoring duration, on demand based on commands received from diagnostic module 116, etc. In at least one embodiment, the functionality of power supply 104 and power monitor 106 may be combined in the same physical device that both provides power and monitors power usage.

Power monitor 106 may also transmit power data 114 via at least one of wired or wireless communication. In system 100 as depicted in FIG. 1, power monitor 106 is transmitting power data 114 via wireless short-range communication (e.g., Bluetooth, wireless local area networking (WLAN), etc.). Power data 114 may comprise, further to the actual power data, data identifying power monitor 106, temporal data (e.g., time, date, etc. corresponding to when power data 114 was sampled), and any other information that may be used later for parsing and correlation (e.g., target device identification, test number, session number, etc.). For example, power monitor 106 may provide power 112 to target device 102 via a universal serial bus (USB) connection, and via USB may learn the identity of target device 102. This data may be included in power data 114.

Consistent with the present disclosure, at least a portion of diagnostic module 116 may be located in target device 102. Diagnostic module 116 may receive power data 114 transmitted by power monitor 106 through communication resources in target device 102. Diagnostic module 116 may further receive operational data 118 from processing resources, memory resources, etc. in target device 102. Operational data 118 may comprise information about what is occurring in target device 102 while power data 114 is accumulated such as, for example, temporally-logged application, service and/or process activity (e.g., start time, end time, percent of CPU time, etc.), hardware activity (e.g., active time, idle time, hibernation time, temperature, etc.), error logging, etc. In at least one embodiment, all of diagnostic module 116 may be located in target device 102, and all of the operations associated with diagnostic module 116 may then be performed in target device 102. Examples of these operations may include, but are not limited to, receiving power data 114 and/or operational data 118, processing power data 114 and/or operational data 118 and presenting the results of processing power data 114 and/or operational data 118. In another embodiment, at least part of diagnostic module 116 may reside in another device (e.g., profiling device 120). Profiling device 120 may be any other device (e.g., desktop, laptop, etc.) configured to perform online (e.g., during the testing of target device 102) and/or offline (e.g., after the testing of target device 102) profiling for target device 102. For example, diagnostic module 116 in target device 102 may comprise only a simple utility, process, etc. to accumulate power data 114 and/or operational data 118, and to then transmit the accumulated power data 114 and/or operational data 118 to diagnostic module 116 in profiling device 120. Diagnostic module 116 in profiling device 120 may then handle the data processing and/or data presentation operations for system 100. More detail in regard to various operations that may be performed by diagnostic module 116 will be provided later in the discussion of FIGS. 3 and 4.

Figure 2:
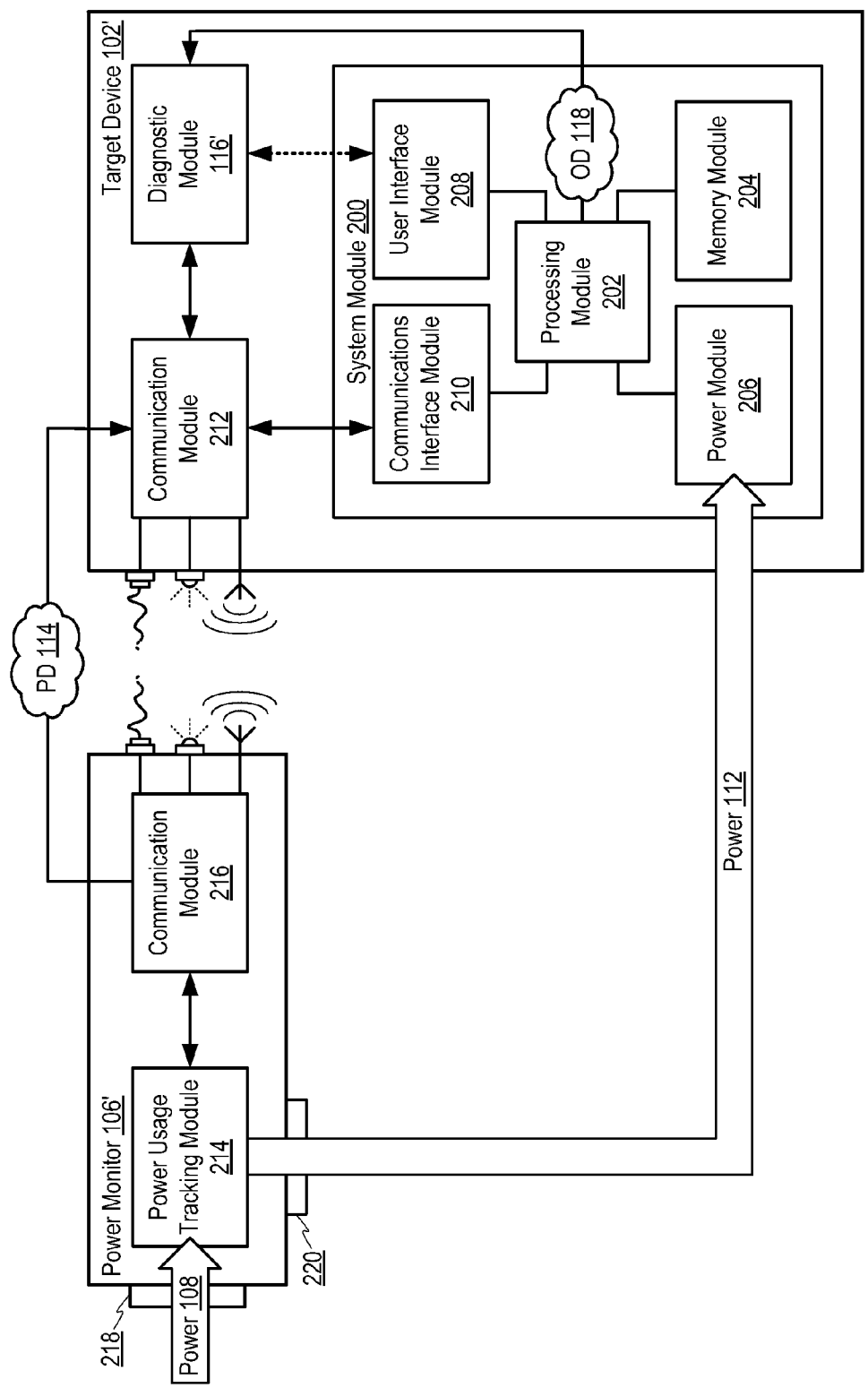
FIG. 2 illustrates example configurations for a power monitor and a target device usable in accordance with at least one embodiment of the present disclosure.

FIG. 2 illustrates example configurations for a power monitor and a target device usable in accordance with at least one embodiment of the present disclosure. In particular, example target device 102' and power monitor 106' may be capable of performing any of the activities disclosed in FIG. 1. However, target device 102' and power monitor 106' are presented only as examples of apparatuses usable in embodiments consistent with the present disclosure, and are not meant to limit any of these various embodiments to any particular manner of implementation.

Target device 102' may comprise, for example, system module 200 to manage operation of the device. System module 200 may include, for example, processing module 202, memory module 204, power module 206, user interface module 208 and communication interface module 210. Target device 102' may further include communication module 212 and diagnostic module 116'. While communication module 212 and diagnostic module 116' are illustrated as separate from system module 200, the example configuration shown in FIG. 2 has been provided merely for the sake of explanation. Some or all of the functionality associated with communication module 212 and/or diagnostic module 116' may also be incorporated into system module 200.

In target device 102', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in target device 102'. Some or all of the functionality commonly associated with the support circuitry may also be included in the same physical package as the processor (e.g., such as in the Sandy Bridge family of processors available from the Intel Corporation).

Processing module 202 may be configured to execute various instructions in target device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include volatile memory configured to hold information during the operation of target device 102' such as, for example, static RAM (SRAM) or Dynamic RAM (DRAM). ROM may include non-volatile (NV) memory modules configured based on BIOS, UEFI, etc. to provide instructions when target device 102' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, external fuel cell, etc.), and related circuitry configured to supply target device 102' with the power needed to operate. User interface module 208 may include hardware and/or software to allow users to interact with target device 102' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 208 may be incorporated within target device 102' and/or may be coupled to target device 102' via a wired or wireless communication medium.

Communication interface module 210 may be configured to manage packet routing and other control functions for communication module 212, which may include resources configured to support wired and/or wireless communications. In some instances, target device 102' may comprise more than one communication module 212 (e.g., including separate physical interface modules for wired protocols and/or wireless radios) managed by a centralized communication interface module 210. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID)or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated into the same module.

Consistent with the present disclosure, diagnostic module 116' may interact with at least communication module 212, processing module 202 and optionally with user interface module 208 in target device 102'. For example, diagnostic module 116' may receive power data 114 via communication module 212. Diagnostic module 116' may further cause communication module 212 to transmit messages to power monitor 106' to configure power monitor 106', to indicate the start of testing for target device 102', etc. Diagnostic module 116' may also receive operational data 118 via processing module 202. Depending on the particular configuration of system 100, diagnostic module 116' may also use processing module 202 to process power data 114 and/or operational data 118 and user interface module 208 to present the results of the data processing.

Power monitor 106' may include, for example, at least power usage tracking module 214, communication module 216, a first power interface 218 and a second power interface 220. First power interface 218 may include at least equipment (e.g., cord, socket, circuitry, etc.) to receive power 108 from power supply 104. First power interface may be reconfigurable depending upon the type of connector/cord utilized by power supply 104. For example, first power interface 218 may be a USB interface or another standardized configuration of power (and communication) interface. In another embodiment, first power interface 218 may include interchangeable parts (e.g., plugs, sockets, tips, connectors, etc.) that mate with a variety of commercially available power supplies 104. Second power interface 220 may be configured similarly to first power interface 218 except that it may provide power 112 to target device 102' (e.g., to power module 206). Again, second power interface may be reconfigurable based on the type of power supply 104 typically utilized by target device 102'. Power usage tracking module 214 may monitor at least one of power 108 coming into power monitor 106' or power 112 being provided to target device 102', and may generate power data 114 based on the monitoring of power 108 and/or 112. Communication module 216 may then transmit power data 114 utilizing at least one of wired or wireless communication. A wireless implementation utilizing, for example, Bluetooth is shown in FIG. 1. In another example, a wired USB connection between power monitor 106' and target device 102' may convey both power 112 and power data 114 to diagnostic module 116'.

Figure 3:
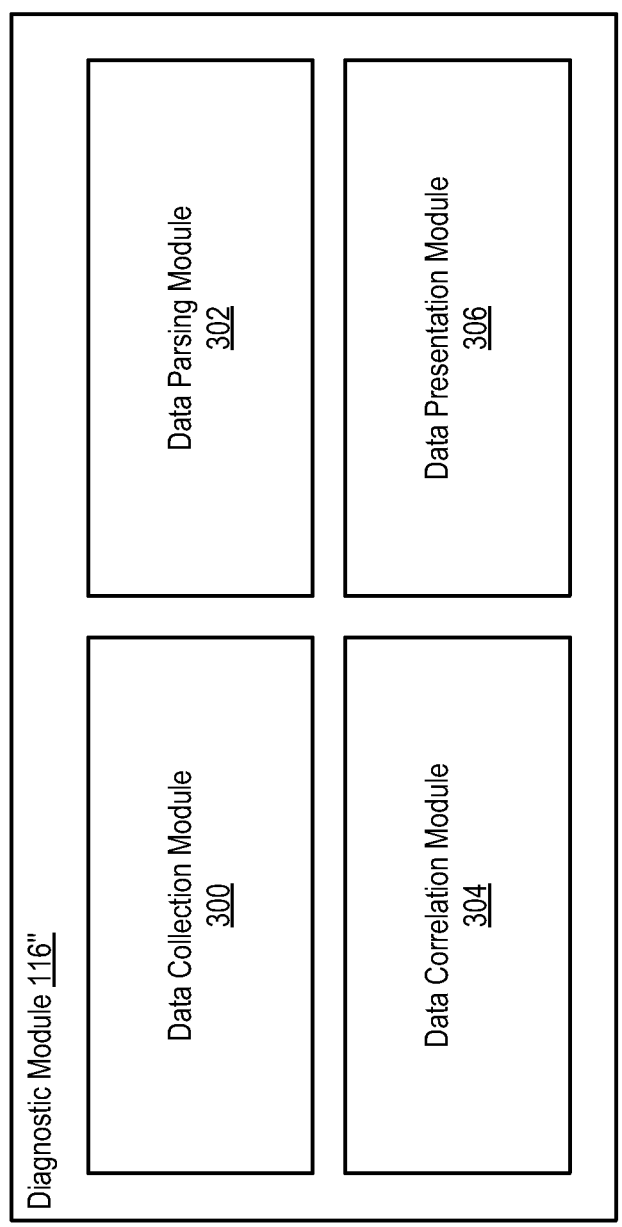
FIG. 3 illustrates an example configuration for a diagnostic module in accordance with at least one embodiment of the present disclosure.

FIG. 3 illustrates an example configuration for a diagnostic module in accordance with at least one embodiment of the present disclosure. Example diagnostic module 116" may comprise at least data collection module 300, data parsing module 302, data correlation module 304 and data presentation module 306. Modules 300 to 306 may all be situated at one location such as in target device 102, or may be split wherein some of modules 300 to 306 may be located remotely. In at least one example implementation, the portion of diagnostic module 116" in target device 102 may only comprise data collection module 300 (e.g., as a simple utility, service, process, etc.) while the portion of diagnostic module 116" situated in profiling device 120 may comprise data parsing module 302, data correlation module 304 and data presentation module 306.

Data collection module 300 may be to accumulate power data 114 and/or operational data 118. Data collection module 300 may be responsible for data collection by receiving individual data samples over time (e.g., a testing period), or may simply receive already accumulated data from power monitor 106, processing module 202, etc. Data parsing module 302 may generate relevant data from power data 114 and/or operational data 118. Generating relevant data may include, but is not limited to, filtering power data 114 and/or operational data 118 to account for noise, interference, errors, events that may have improperly influenced the accumulated data, etc. Data correlation module 304 may then proceed to correlate the relevant power data with the relevant operational data 118. Correlation may align causes and effects for power consumption in target device 102 so that these relationships may be evaluated. For example, correlation may include, but is not limited to, aligning and relating power changes with CPU states (e.g., C-state residency when a CPU is idle and P-state residency when the CPU is active), interrupt and expired time quantification, power-data tracing during different stages of software execution, etc.

Data presentation module 306 may be responsible for the presentation of power data 114, operational data 118 and/or the correlated data. As referenced herein, presentation may include presenting (e.g., in a visible, audible or tactile format) various data for consumption by a user. Examples of presentation may include tables, spreadsheets, graphs, charts, audible or visible alerts, etc. In at least one embodiment wherein, for example, diagnostic module 116" is wholly situated within target device 102, data presentation module 306 may cause target device 102 to present power data 114, operational data 118 and/or the correlated data (e.g., via user interface module 208). Instead of, or along with, the presentation by target device 102, data presentation module 306 may comprise webpage construction resources such as, for example, webpage code generators based on Hypertext Markup Language (HTML), Java, Cascading Style Sheets (CSS), etc. to push power data 114, operational data 118 and/or the correlated data out to the Internet for online consumption. A third option, usable alone or in conjunction with one or both of the above presentation options, is for data presentation module 306 to transmit power data 114, operational data 118 and/or the correlated data to a another device such as profiling device 120. Profiling device 120 may then be able to, for example, present power data 114, operational data 118 and/or the correlated data in an online or offline mode.

FIG. 4 illustrates example operations for device-agnostic power monitoring and profiling in accordance with at least one embodiment of the present disclosure. In operation 400 a target device may be configured. For example, configuration may include disabling an internal power source (e.g., a battery) in the target device so that the only source of power when power usage is being monitored in the target device is the power provided from an external power source via a power monitor. Having both the battery and the external power source active would skew the power data. After the target device is configured in operation 400, power data may be received from the power monitor and operational data may be received from the target device (e.g., from a processing module in the target device). The reception of the power and/or operational data may be implementation-dependent. For example, the power and/or operational data may be received periodically over the duration of a power consumption test. A determination may then be made in operation 404 as to whether the power and/or operational data will be processed locally (e.g., in the target device). If in operation 404 it is determined that the power and/or operational data will not be processed locally, then in operation 406 the power and/or operational data may be transmitted to another device (e.g., to a profiling device).

If in operation 404 it is determined that the power and/or operational data will be locally processed, then processing may proceed in operation 408. Processing may comprise parsing the power and/or operational data to yield relevant power and/or operational data, and correlating the relevant power data with the relevant operational data. Data may then be presented in operation 410. Data presentation in operation 410 may include one or more of presenting the power data, operational data and/or correlated data on the target device, on the Internet or via another device. Presentation on the target device may comprise the visual, audible and/or tactile presentation of the power data, operational data and/or correlated data. Internet presentation may comprise pushing the power data, operational data and/or correlated data out to a webpage (e.g., utilizing webpage code generation tools). The power data, operational data and/or correlated data may also be transmitted to another device (e.g., the profiling device) for online/offline presentation. Operations 400 to 410 may reinitiate whenever power consumption is tested on a target device.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure. As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to device-agnostic power monitoring and profiling. A target device may be supplied with power through a power monitor that may generate power data based on the power provided to the target device and also transmit the power data. A diagnostic module in the target device may receive the power data and operational data regarding the target device. The diagnostic module may transmit at least one of the power data or the operational data to another device for processing, or may undertake processing the power and operational data. Processing the power and operational data may include generating relevant data by parsing the power and operational data and may then correlate the relevant power data with the relevant operational data. At least the correlated data may then be presented by the target device, may be made available via the Internet and/or may be transmitted to another device.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for device-agnostic power monitoring and profiling.

According to example 1 there is provided a target device. The target device may comprise a processing module to at least generate operational data regarding the target device, a communication module to at least interact with a power monitor, a power module to at least receive power via the power monitor and a diagnostic module to at least receive the power data from the power monitor via the communication module and to receive the operational data from the processing module.

Example 2 may include the elements of example 1, wherein the diagnostic module is further to cause the target device to become configured for power monitoring.

Example 3 may include the elements of example 2, wherein in causing the target device to become configured the diagnostic module is to cause the target device to at least disable an internal power source.

Example 4 may include the elements of any of examples 1 to 3, wherein the power monitor is external to and coupled to the target device, the power monitor comprising at least a power usage tracking module to at least generate the power data and a communication module to at least transmit the power data.

Example 5 may include the elements of example 4, wherein the communication module in the power monitor is to at least transmit the power data via a short-range wireless communication medium.

Example 6 may include the elements of example 5, wherein the short-range wireless communication medium is Bluetooth.

Example 7 may include the elements of any of examples 1 to 6, wherein the diagnostic module is further to cause at least one of the power data or the operational data to be transmitted to another device.

Example 8 may include the elements of any of examples 1 to 7, wherein the diagnostic module is further to process the power and operational data.

Example 9 may include the elements of example 8, wherein in processing the power and operational data the diagnostic module is to at least parse the power and operational data to determine relevant power and operational data, and to correlate the relevant power with the relevant operational data.

Example 10 may include the elements of example 9, wherein the diagnostic module is further to cause at least one of the correlated data to be presented by the target device, the correlated data to be accessible via the Internet or the correlated data to be transmitted to another device.

Example 11 may include the elements of any of examples 1 to 10, wherein the diagnostic module is further to cause the target device to become configured for power monitoring by at least disabling an internal power source.

Example 12 may include the elements of any of examples 1 to 11, wherein the diagnostic module is further to process the power and operational data by at least parsing the power and operational data to determine relevant power and operational data and correlating the relevant power with the relevant operational data.

According to example 13 there is provided a power monitor. The power monitor may comprise a first power interface through which power is received from a power source, a second power interface through which the power is provided to a target device, a power usage tracking module to at least generate power data regarding the power provided to the target device and a communication module to at least transmit the power data.

Example 14 may include the elements of example 13, wherein at least one of the first power interface is configurable based on the power source or the second power interface is configurable based on the target device.

Example 15 may include the elements of any of examples 13 to 14, wherein the communication module in the power monitor is to at least transmit the power data via a short-range wireless communication medium.

Example 16 may include the elements of example 15, wherein the short-range wireless communication medium is Bluetooth.

Example 17 may include the elements of any of examples 13 to 16, wherein the communication module is to transmit the power data to a diagnostic module residing in at least one of a target device or a profiling device.

According to example 18 there is provided a method for power monitoring and profiling. The method may comprise receiving power in a target device via a power monitor, receiving power data at a diagnostic module in the target device from the power monitor, generating operational data in a processing module in the target device and receiving the operational data from the processing module at the diagnostic module.

Example 19 may include the elements of example 18, and may further comprise causing the target device to become configured for power monitoring.

Example 20 may include the elements of example 19, wherein causing the target device to become configured comprises causing the target device to at least disable an internal power source.

Example 21 may include the elements of any of examples 18 to 20, and may further comprise causing at least one of the power data or the operational data to be transmitted to another device.

Example 22 may include the elements of any of examples 18 to 21, and may further comprise processing the power and operational data.

Example 23 may include the elements of example 22, wherein processing the power and operational data comprises at least parsing the power and operational data to determine relevant power and operational data, and correlating the relevant power with the relevant operational data.

Example 24 may include the elements of example 23, and may further comprise causing at least one of the correlated data to be presented by the target device, the correlated data to be accessible via the Internet or the correlated data to be transmitted to another device.

Example 25 may include the elements of any of examples 18 to 24, and may further comprise causing the target device to become configured for power monitoring by at least disabling an internal power source.

Example 26 may include the elements of any of examples 18 to 25, and may further comprise processing the power and operational data, wherein processing the power and operational data includes at least parsing the power and operational data to determine relevant power and operational data and correlating the relevant power with the relevant operational data.

According to example 27 there is provided a method for generating and transmitting power data. The method may comprise receiving power from power source through a first power interface, providing power through a second power interface to a target device, generating power data regarding the power provided to the target device and transmitting the power data. Example 28 may include the elements of example 27, and may further comprise configuring at least one of the first power interface based on the power source or the second power interface based on the target device.

Example 29 may include the elements of any of examples 27 to 28, wherein the power data is transmitted via a short-range wireless communication medium. Example 30 may include the elements of example 29, wherein the short-range wireless communication medium is Bluetooth.

Example 31 may include the elements of any of examples 27 to 30, wherein the power data is transmitted to a diagnostic module residing in at least one of a target device or a profiling device.

According to example 32 there is provided a system including at least a target device and a power monitor, the system being arranged to perform the method of any of the above examples 18 to 31.

According to example 33 there is provided a chipset arranged to perform the method of any of the above examples 18 to 31.

According to example 34 there is provided at least one machine readable medium comprising a plurality of instructions that, in response to be being executed on a computing device, cause the computing device to carry out the method according to any of the above examples 18 to 31.

According to example 35 there is provided a device configured for power monitoring and profiling, the device being arranged to perform the method of any of the above examples 18 to 31.

According to example 36 there is provided a system for power monitoring and profiling. The system may comprise means for receiving power in a target device via a power monitor, means for receiving power data at a diagnostic module in the target device from the power monitor, means for generating operational data and means for receiving the operational data from the processing module at the diagnostic module.

Example 37 may include the elements of example 36, and may further comprise means for causing the target device to become configured for power monitoring. Example 38 may include the elements of example 37, wherein the means for causing the target device to become configured comprise means for causing the target device to at least disable an internal power source.

Example 39 may include the elements of any of examples 36 to 38, and may further comprise means for causing at least one of the power data or the operational data to be transmitted to another device.

Example 40 may include the elements of any of examples 36 to 39, and may further comprise means for processing the power and operational data.

Example 41 may include the elements of example 40, wherein the means for processing the power and operational data comprise means for at least parsing the power and operational data to determine relevant power and operational data, and correlating the relevant power with the relevant operational data.

Example 42 may include the elements of example 41, and may further comprise means for causing at least one of the correlated data to be presented by the target device, the correlated data to be accessible via the Internet or the correlated data to be transmitted to another device.

According to example 43 there is provided a system for generating and transmitting power data. The system may comprise means for receiving power from power source through a first power interface, means for providing power through a second power interface to a target device, means for generating power data regarding the power provided to the target device and means for transmitting the power data.

Example 44 may include the elements of example 43, and may further comprise means for configuring at least one of the first power interface based on the power source or the second power interface based on the target device.

Example 45 may include the elements of any of examples 43 to 44, wherein the power data is transmitted via a short-range wireless communication medium.

Example 46 may include the elements of example 45, wherein the short-range wireless communication medium is Bluetooth.

Example 47 may include the elements of any of examples 43 to 46, wherein the power data is transmitted to a diagnostic module residing in at least one of a target device or a profiling device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system for power monitoring and profiling, comprising:
  a power supply;
  power monitoring circuitry to receive power from the power supply;
  a target device to receive power from the power monitoring circuitry, the target device including:
    a processor to at least determine operational data regarding the target device;
  communication circuitry to at least communicate with the power monitoring circuitry and a profiling device;
  power circuitry to at least receive power via the power monitoring circuitry; and
  diagnostic circuitry to at least:
    receive power data from the power monitoring circuitry via the communication circuitry, wherein the power monitoring circuitry is to generate the power data by measuring the power in response to at least one command received from the diagnostic circuitry, the power data including at least one of test number or session number data; and
    receive the operational data from the processor; and
  wherein:
    the power monitoring circuitry is to provide the power data to the profiling device;
    the target device is to provide the operational data to the profiling device; and
    the profiling device includes profiling diagnostic circuitry to:
      parse the power data and the operational data to determine relevant power data and relevant operational data;
      correlate the relevant power data with the relevant operational data, the correlated data to indicate:
        one or more effects on power consumption in the target device; and
        one or more causes of power consumption in the target device, wherein each cause is correlated with a corresponding effect; and
      profile power consumption of the target device based, at least in part, on the correlated power data and operational data; and
    the profiling device is to profile power consumption of the target device without being specifically configured for the target device.

2. The system of claim 1, wherein the profiling device is further to cause the target device to become configured for power monitoring.

3. The system of claim 2, wherein in causing the target device to become configured the diagnostic circuitry is to cause the target device to at least disable an internal power source.

4. The system of claim 1, wherein the power monitoring circuitry is external to and coupled to the target device, the power monitoring circuitry comprising at least a power usage tracking circuitry to at least generate the power data and communication circuitry to at least transmit the power data.

5. The system of claim 4, wherein the communication circuitry in the power monitoring circuitry is to at least transmit the power data via a short-range wireless communication medium.

6. The system of claim 1, wherein the diagnostic circuitry is further to cause at least one of the power data or the operational data to be transmitted to another device.

7. The system of claim 1, wherein the diagnostic circuitry is further to cause at least one of the correlated data to be presented by the target device, the correlated data to be accessible via the Internet or the correlated data to be transmitted to another device.

8. The system of claim 1, wherein said power monitoring circuitry comprises:

a first power interface through which power is received from the power source;
a second power interface through which the power is provided to the target device;
power usage tracking circuitry to at least generate the power data, the power data regarding the power provided to the target device; and
a communication circuitry to at least transmit the power data.

9. The system of claim 8, wherein the communication circuitry in the power monitoring circuitry is to at least transmit the power data via a short-range wireless communication medium.

10. A method for power monitoring and profiling, comprising:
receiving power at power monitoring circuitry from a power supply;
receiving power in a target device via the power monitoring circuitry;
receiving power data at diagnostic circuitry included in the target device from the power monitoring circuitry, wherein the power monitoring circuitry is to generate the power data by measuring the power in response to at least one command received from the diagnostic circuitry, the power data including at least one of test number or session number data;
determining, via a processor included in the target device, operational data;
receiving, via the diagnostic circuitry, the operational data from the processor;
providing, via the power monitoring circuitry, the power data to a profiling device;
providing, via the target device, operational data to the profiling device;
parsing, via profiling diagnostic circuitry included in the profiling device, the power data and the operational data;
determining, via the profiling diagnostic circuitry based on the parsing, relevant power data and relevant operational data;
correlating, via the profiling diagnostic circuitry, the relevant power data with the relevant operational data, wherein the correlated data is to indicate:
one or more effects on power consumption in the target device; and
one or more causes of power consumption in the target device, wherein each cause is correlated with a corresponding effect; and
profiling, via the profiling diagnostic circuitry, power consumption of the target device based, at least in part, on the correlated power data and operational data, wherein the profiling diagnostic circuitry is to profile power consumption of the target device without being specifically configured for the target device.

11. The method of claim 10, further comprising:
causing the target device to become configured for power monitoring.

12. The method of claim 11, wherein causing the target device to become configured comprises causing the target device to at least disable an internal power source.

13. The method of claim 10, further comprising causing at least one of the power data or the operational data to be transmitted to another device.

14. The method of claim 10, further comprising:
causing at least one of the correlated data to be presented by the target device, the correlated data to be accessible via the Internet or the correlated data to be transmitted to another device.

15. At least one non-transitory computer readable storage medium having stored thereon, individually or in combination, instructions for power monitoring and profiling that, when executed by one or more processors, cause the one or more processors to:
receive power in a target device via power monitoring circuitry;
receive power data at diagnostic circuitry included in the target device from the power monitoring circuitry, wherein the power monitoring circuitry is to generate the power data by measuring the power in response to at least one command received from the diagnostic circuitry, the power data including at least one of test number or session number data;
determine operational data;
receive the operational data at the diagnostic circuitry;
provide the power data and the operational data to a profiling device;
cause profiling diagnostic circuitry included in the profiling device to:
parse the power data and the operational data;
determine relevant power data and relevant operational data based, at least in part, on the parsed data;
correlate the relevant power data with the relevant operational data, wherein the correlated data is to indicate:
one or more effects on power consumption in the target device; and
one or more causes of power consumption in the target device, wherein each cause is correlated with a corresponding effect; and
profile power consumption of the target device based, at least in part, on the correlated power data and operational data, wherein the profiling diagnostic circuitry is to profile power consumption of the target device without being specifically configured for the target device.

16. The non-transitory computer readable storage medium of claim 15, further comprising instructions that, when executed by one or more processors, cause the one or more processors to cause the target device to become configured for power monitoring.

17. The non-transitory computer readable storage medium of claim 16, wherein the instructions to cause the target device to become configured comprise instructions to cause the target device to at least disable an internal power source.

18. The non-transitory computer readable storage medium of claim 15, further comprising instructions that, when executed by one or more processors, cause the one or more processors to cause at least one of the power data or the operational data to be transmitted to another device.

19. The non-transitory computer readable storage medium of claim 15, further comprising instructions that, when executed by one or more processors, cause the one or more processors to:
cause at least one of the correlated data to be presented by the target device, the correlated data to be accessible via the Internet or the correlated data to be transmitted to another device.

* * * * *